(12) United States Patent
Chainer et al.

(10) Patent No.: US 6,208,485 B1
(45) Date of Patent: Mar. 27, 2001

(54) MICROFILE

(75) Inventors: Timothy Joseph Chainer, Mahopac; Lubomyr Taras Romankiw, Briarcliff Manor, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/405,561

(22) Filed: Mar. 16, 1995

(51) Int. Cl.$^7$ .............................. G11B 17/02; G11B 5/31
(52) U.S. Cl. ...................................... 360/98.07; 360/294.2
(58) Field of Search ............................. 360/98.01, 98.07, 360/99.04, 99.08, 105–106; 369/36, 38, 247–249; 310/40 MM, 261, 267–268, 162–164, 308–309

(56) References Cited

U.S. PATENT DOCUMENTS

| | | | |
|---|---|---|---|
| 3,553,662 | * 1/1971 | Goss | 360/98.01 |
| 4,658,162 | 4/1987 | Koyama et al. | 310/68 R |
| 4,933,785 | 6/1990 | Morehouse et al. | 360/78.04 |
| 5,177,389 | 1/1993 | Schalk | 310/171 |
| 5,191,251 | 3/1993 | Paratte | 310/309 |
| 5,252,881 | 10/1993 | Muller et al. | 310/309 |
| 5,257,151 | * 10/1993 | Cooper et al. | 360/98.07 |
| 5,262,695 | 11/1993 | Kuwano et al. | 310/309 |
| 5,264,975 | * 11/1993 | Bajorek et al. | 360/97.01 |
| 5,296,775 | 3/1994 | Cronin et al. | 310/309 |
| 5,304,878 | 4/1994 | Oda et al. | 310/67 R |

FOREIGN PATENT DOCUMENTS

| | | |
|---|---|---|
| 0 597 186 A2 | 5/1994 | (EP). |
| 0 637 022 A2 | 2/1995 | (EP). |
| WO 94 29866 | 12/1994 | (WO). |
| WO 95 02247 | 1/1995 | (WO). |

OTHER PUBLICATIONS

Romankiw, "Think Small, One Day it May be Worth a Billion, " Mar. 10, 1993, 2 pages.

Guckel et al, "A First Functional Current Excited Planar Rotational Magnetic Micromotor," Feb. 1993, IEEE, pp: 7–11.

Ahn et al, "A Planar Variable Reluctance Magnetic Micromotor with Fully Integrated Stator and Wrapped Coils," Feb. 1993, IEEE, pp: 1–6.

Chainer et al, "A Flexural In–Line Actuator for Magnetic Recording Disk Drives," IEEE Transactions on Magnetics, vol.27,No.6,Nov. 1991,pp.5295–5297.

IBM, "PCMCIA Cards, The Future is in your Hands," 2 pages, product literature older than 1 year.

Ahn et al, "A Fully Integrated Micromachined Toroidal Inductor with a Nickel–Iron Magnetic Core(The Switched DC/DC Boost Converter Application)" Transducers 1994 Workshop, 4 pages.

* cited by examiner

Primary Examiner—George J. Letscher
(74) Attorney, Agent, or Firm—Francis L. Conte

(57) ABSTRACT

An integrated microfile includes a rotatably supported magnetic disk for storing data and a micromotor for rotating the disk. The micromotor includes a rotor fixedly joined to the disk and having a plurality of rotor poles. A stator includes a plurality of stator poles positioned around the rotor for sequentially cooperating with respective ones of the rotor poles for rotating the rotor to rotate the disk. A selectively movable access head is disposed adjacent to the disk for selectively addressing the data on the disk. The microfile may be fabricated using lithographic and electroplating techniques in subform-factor sizes in an exemplary embodiment.

23 Claims, 3 Drawing Sheets

MICROFILE

CROSS-REFERENCE TO RELATED APPLICATION

The present invention is related to concurrently filed patent application Ser. No. 08/405,278, filed Mar. 16, 1995, entitled "Integrated Data Storage Disk and Disk Drive."

BACKGROUND OF THE INVENTION

The present invention relates generally to data storage disks, and, more specifically, to micro sized versions thereof.

One type of media for the storing of binary bits of computer data is a magnetic disk typically referred to as a hard disk or hard drive. The disk includes a substrate having a suitable magnetic coating for allowing data to be written thereto and read therefrom in a conventional fashion using a suitable read/write access head. Advances in disk design are being continually made for storing ever increasing amounts of data in smaller and smaller disks.

More specifically, standard form factors are known in the industry which indicate the relative size of data storage disks. Common disk form factors include in decreasing size 5.25 in (14.6 cm), 3.5 in (10.0 cm), 2.5 in (7.3 cm), 1.8 in (5.0 cm), and 1.3 in (3.7 cm). The 14.6 cm form factor is defined by a rectangle 14.6 cm by 20 cm having an area of 292 cm$^2$. Each successive form factor has half the area of the previous form factor and is obtained by defining a rectangle having a narrow side being one half the long side of the next larger form factor rectangle. Form factors have been continuing to decrease due to the increase in magnetic storage density being developed.

In order to access data storage sectors on the disk, both the access head and the disk are suitably set into motion, with the disk being typically rotated at a suitable rotational velocity. A typical disk drive motor is mounted to the center of the disk for suitably spinning the disk for allowing access to the various sectors thereof.

In a separate development, various types of micromechanical systems (MEMS) such as variable reluctance magnetic micromotors are being fabricated using high aspect ratio lithographic techniques and electroplating processes to form the components thereof. A rotor having one set of poles is assembled to a stator having another set of poles for forming the micromotor. The stator poles include a core formed of a high permeability magnetic material such as nickel-iron around which is formed a conducting coil such as copper. The stator and a stationary support pin for the rotor may be formed using polyimide as a dielectric in a multilevel fabrication process using suitable lithographic masks to define the required components and conventional metal deposition such as electroplating for forming the magnetic core, the conducting coils, and the rotor support pin. The rotor and its poles can be separately fabricated using lithographic and electroplating techniques in a conventional manner, or the rotor and the stator can be fabricated together on one substrate, with the rotor being released using a suitable lift off technique. The assembled micromotor requires no permanent magnets to produce a torque moment, although they may be used in other embodiments. The stator coils are arranged in one or more sets, and phases are excited individually or in pairs to produce torque for rotor rotation. When a phase coil is excited, the nearest rotor poles adjacent to the excited stator poles are attracted to the stator poles. The rotor then rotates to align the rotor poles with the excited stator poles, at which time the excited phase is cut off, and the next phase is then excited to maintain continuous rotation of the rotor by sequentially exciting the stator poles.

In order to further reduce the size of data storage disks, it is desirable to integrate therewith a suitable micromotor for creating data storage microfiles.

SUMMARY OF THE INVENTION

An integrated microfile includes a rotatably supported magnetic disk for storing data and a micromotor for rotating the disk. The micromotor includes a rotor fixedly joined to the disk and having a plurality of rotor poles. A stator includes a plurality of stator poles positioned around the rotor for sequentially cooperating with respective ones of the rotor poles for rotating the rotor to rotate the disk. A selectively movable access head is disposed adjacent to the disk for selectively addressing the data on the disk. The microfile may be fabricated using lithographic and electroplating techniques in subform-factor sizes in an exemplary embodiment.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
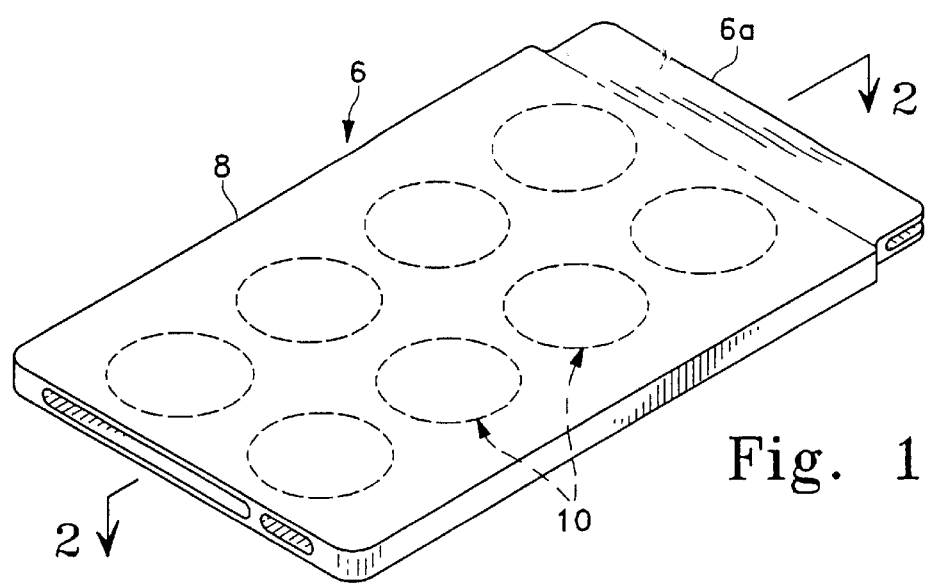
FIG. 1 is an isometric view of an exemplary microcard having a plurality of microfiles therein in accordance with one embodiment of the present invention.
Figure 2:
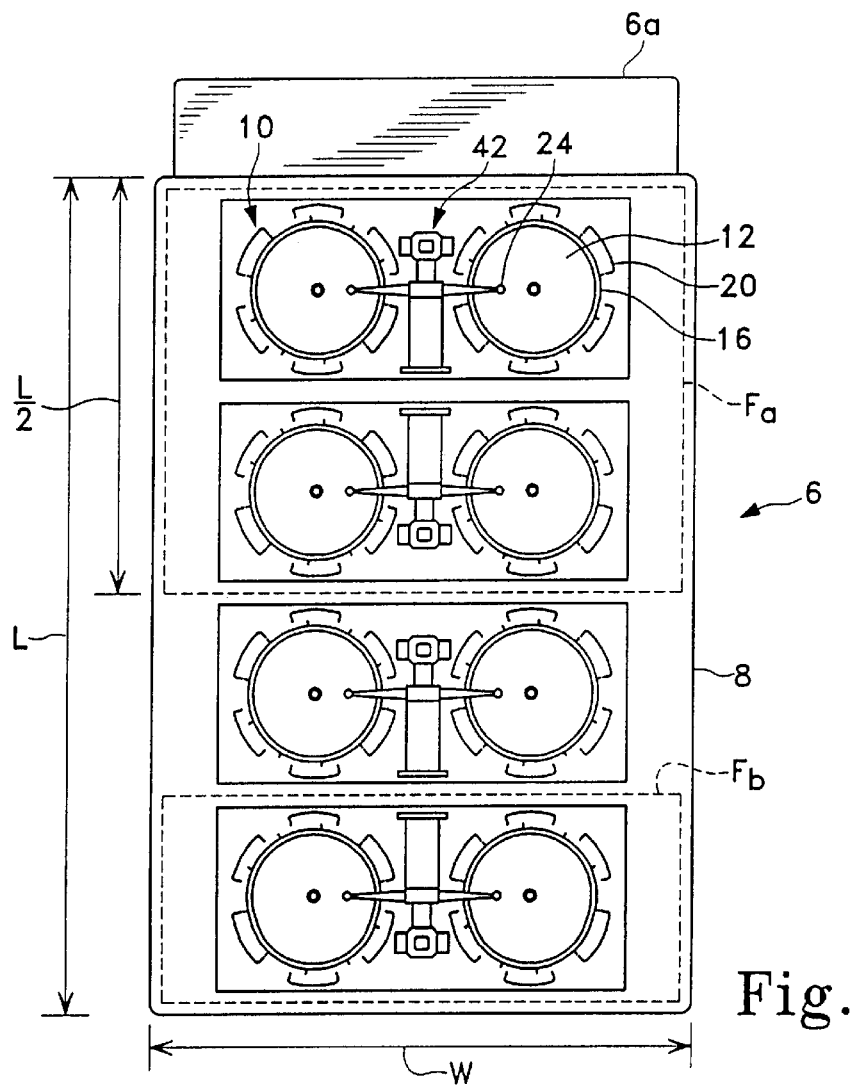
FIG. 2 is a schematic, sectional view of the microcard illustrated in FIG. 1 and taken along line 2—2.

Illustrated schematically in FIGS. 1 and 2 is an exemplary embodiment of a microfile card 6, or simply microcard, having a suitable plastic housing 8 in which are contained a plurality of integrated data storage disk and disk drive assemblies 10, also referred to as microfilms, in accordance with one embodiment of the present invention. In this exemplary embodiment, eight microfiles 10 are arranged in the standard 5.0 cm disk form factor within the Personal Computer Memory Card International Association (PCMCIA) standard form, with a width W of about 5.0 cm and a length L of about 7.3 cm. The PCMCIA standard storage card 6 includes a conventional connector 6a at one end thereof which typically includes sixty-eight electrical contact pins therein (not shown) which allows the microcard 6 to be inserted into a complementary slot in a conventional personal computer for being operated thereby. And, the thickness of the card 6 determines its conventional type designation such as Type I, Type II, or Type III.

Figure 3:
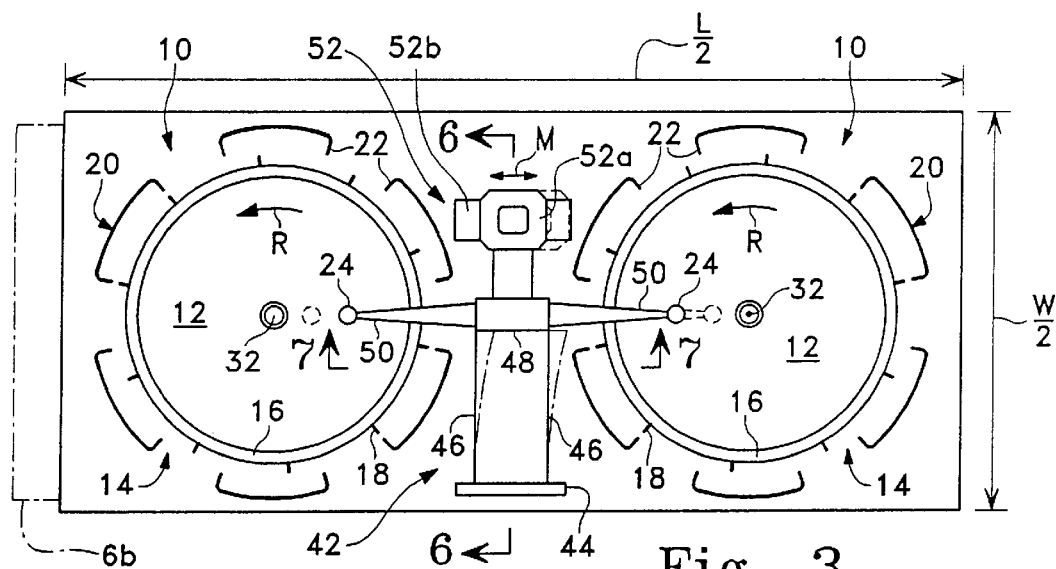
FIG. 3 is an enlarged schematic view of an exemplary pair of adjoining microfiles illustrated in FIG. 2.

An exemplary pair of laterally adjoining or side-by-side, coplanar microfiles 10 is illustrated in more particularity in FIG. 3 in accordance with one embodiment of the present invention. Each of the microfiles 10 includes a rotatably supported magnetic storage disk 12 for magnetically storing data or information in a conventional manner using binary data bits in this exemplary embodiment. In accordance with one feature of the present invention, a micromotor 14 is integrated with the disk 12 for providing an effective disk drive therefor. The micromotor 14 includes a rotor 16 integrated with the disk 12 in a one-piece assembly for rotating the disk 12 therewith, with the rotor 16 including a plurality of magnetic rotor poles 18 extending radially outwardly from the perimeter of the rotor 16 and being circumferentially spaced apart from each other therearound.

The micromotor 14 further includes a stator 20 having a plurality of magnetic stator poles 22 circumferentially spaced apart from each other around the rotor 16 for sequentially cooperating with respective ones of the rotor poles 18 for rotating the rotor 16 to in turn drive or rotate the disk 12 for magnetically reading therefrom and writing thereto the data using a suitable read and write or access head 24.

The resulting micromotor 14 is one type of variable reluctance magnetic motor which does not require permanent magnets to produce torque for rotating the disk 12, although permanent magnets could be used if desired. The micromotor 14 may have any suitable number of rotor and stator poles 18, 22 cooperating in a conventional manner for imparting rotation of the disk 12 by sequentially energizing the stator poles 22 in different phases for rotating the rotor poles 18 and in turn the disk 12 joined thereto. In the exemplary embodiment illustrated in FIG. 3, diametrically opposite pairs of the stator poles 22 may be suitably energized with a DC current which will magnetically attract directly adjacent rotor poles 18 thereto and therefore cause rotation thereof. When one set of the rotor poles 18 are aligned with the excited set of stator poles 22, power thereto is interrupted, with power then being applied to an adjacent set of stator poles 22 for magnetically attracting thereto another set of the rotor poles 18. In this way, the stator poles 22 may be energized sequentially for sequentially attracting adjacent rotor poles 18 for maintaining continuous rotation of the rotor 16 and in turn the disk 12. The stator poles 22 are therefore arranged in cooperating pairs on opposite sides of the rotor 16, with sequential stator pole pairs being electrically energized in different phases for maintaining rotation of the rotor 16 and the disk 12.

The microfile 10 may be fabricated substantially smaller in size than that of conventional disks using conventional high aspect ratio lithographic and electroplating techniques in batch fabrication processes. For example, each of the disks 12 and its integral rotor 16 illustrated in FIG. 3 may have an outer diameter of less than about 20 mm, with a thickness of about 500 microns for example. In the exemplary embodiment illustrated in FIGS. 2 and 3, the magnetic disk 12 is integrated directly with the rotor 16 at its perimeter, with the rotor 16 being coplanar with and integrally surrounding the disk 12. The integrated disk and rotor 12, 16 may be conventionally fabricated using a suitable substrate such as silicon, glass, ceramic, etc. in the form of a disk, with the top and bottom surfaces thereof being conventionally coated with a suitable high coercivity magnetic storage media, such as cobalt platinum chrome and others sputtered thereon in a thin layer. The perimeter of the disk 12 includes the base of the rotor 16, with the rotor poles 18 being formed of a suitable high permeability, low coercivity, high moment or soft magnetic material such as a nickel-iron alloy, CoFeCu, CoNiFe, or CoFe alloy for examples. The magnetic material forming the rotor poles 18 may be suitably electroplated at the perimeter of the disk 12, or otherwise formed thereat.

As indicated above, by sequentially energizing the stator poles 22 shown in FIG. 3, the cooperating rotor poles 18 are magnetically attracted thereto for rotating the disk 12 in the exemplary counterclockwise rotation direction R. The access head 24 illustrated schematically in FIG. 3 may be selectively moved as represented by the arrow M for accessing the various sectors between the inner and outer diameters of the disk 12 for reading and writing data in a conventionally known manner.

Figure 4:
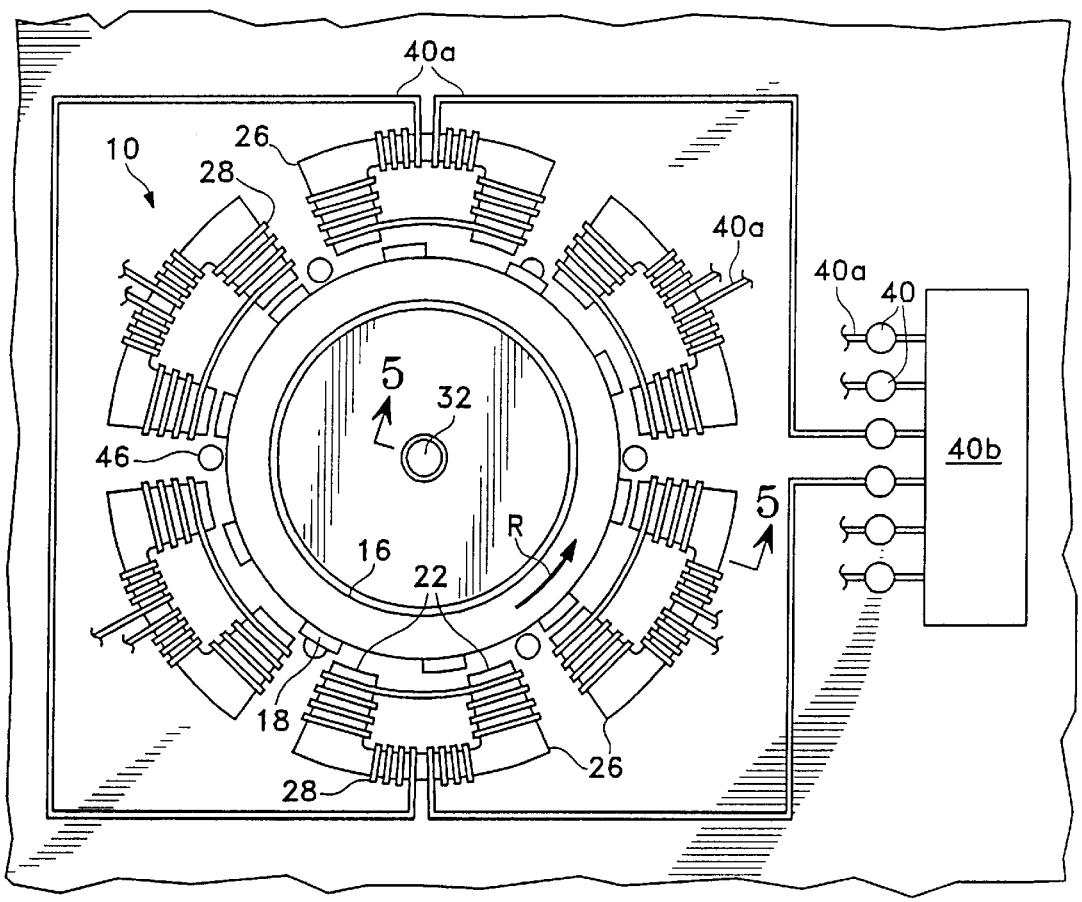
FIG. 4 is an enlarged schematic view of an exemplary one of the microfiles 10 illustrated in FIG. 3.
Figure 5:
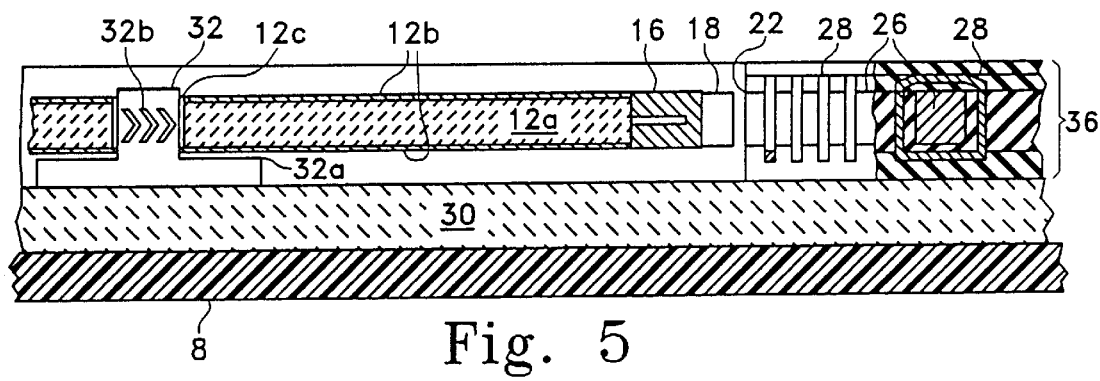
FIG. 5 is a sectional view of a portion of the microfile illustrated in FIG. 4 and taken along line 5—5.

FIGS. 4 and 5 illustrate in more particularity an exemplary embodiment of one of the microfiles 10 illustrated in FIG. 3. Each of the stator poles 22 includes a suitable magnetic core 26 integrally wound with an electrically conducting excitation coil 28 for generating a magnetic flux through the core 26 upon energizing thereof. In the preferred embodiment illustrated in FIG. 4, the coils 28 spiral around the cores 26 in three dimensions with a suitable number of turns thereof.

In this exemplary embodiment, each of the stator cores 26 is generally U-shaped and is disposed coplanar with the rotor 16. Each U-shaped stator core 26 defines a pair of circumferentially adjacent stator poles 22. The rotor 16 is in the form of a magnetic ring integrally joined to the rotor poles 18, which extend radially outwardly therefrom for carrying magnetic flux between diametrically opposite ones of the rotor poles 18. In the exemplary embodiment illustrated in FIG. 4, there are ten rotor poles 18 equiangularly spaced apart from each around the rotor 16 at 36°. Each rotor pole 18 is about 12° wide. And, there are twelve stator poles 22 with adjacent poles 22 of each core 26 being spaced apart at 36°, and adjacent cores 26 being spaced apart at 24° between adjacent stator poles 22. Each stator pole 22 is about 12° wide. This stator/rotor pole arrangement is one of many conventional arrangements which may be used for rotating the rotor 16 by sequentially energizing the stator poles 22 in three phases, e.g. thirty strokes of 12° each per revolution.

Also illustrated schematically in FIG. 4 are a plurality of conventional position sensors 46 suitably located adjacent to the rotor 16 for detecting position of the rotor poles 18 to enable commutation of the rotor 16 as is conventionally known. However, the sensors 46 may be directly integrated on the substrate 30 in accordance with another feature of the present invention to provide integrated current paths to the drive electronics.

In the exemplary embodiment illustrated in FIG. 5, the stator 20 may be formed in layers using high aspect ratio lithographic and metal deposition techniques on a suitable substrate 30 such as a silicon wafer and others. Optical (photo) and X-ray lithography are conventional processes that may be used; and electroplating, electroless plating, and sputtering are also conventional processes that may be used. The integrated disk and rotor 12, 16 may be similarly fabricated, for example, by using a silicon wafer or substrate 12a in the form of a disk, with the top and bottom surfaces thereof being conventionally coated with a suitable high corecivity magnetic storage media 12b, such as cobalt platinum chrome or others sputtered thereon in a thin layer. A suitable support shaft or pin 32 is built up from the substrate 30 and is received in a central bore 12c of the disk 12 for allowing the disk 12 and integral rotor 16 to rotate on the shaft 32. The shaft 32 includes a step 32a for axially supporting the disk 12 when it is stationary if desired, and includes a self-pressurizing air journal bearing 32b in the form of a plurality of circumferentially spaced apart chevron-shaped indentations therein. Self-pressurizing air thrust bearings (not shown) in the form of grooves are provided in the step 32a for vertically supporting the shaft 32 during rotation.

The resulting microfile 10 may be fabricated in relatively small sizes with the disk 12 being driven by the integral micromotor 14. Although data is stored on the disk 12 magnetically, it is not compromised by the magnetic field associated with the integrated micromotor 14 due to the placement of the micromotor 14 around the perimeter of the disk 12 and due to the relatively low magnetic flux leakage from the micromotor 14. The stator poles 22 are suitably sized and operated for rotating the rotor 16 with a magnetic flux leakage of at least an order of magnitude less than the magnetic flux required for magnetically recording the data on the disk 12. Typical magnetic flux leakage from the micromotor 14 may be on the order of about 50 Gauss, whereas the magnetic flux required for writing to the disk 12 is typically on the order of about 1,000 Gauss. If desired, suitable shielding (not shown) may be provided around the micromotor 14 to additionally protect the integrity of the data magnetically stored on the disk 12.

The microfile 10 may be sized and operated for rotating the disk 12 within an exemplary range of 3,500 to 35,000 rpm. The magnetic field generated by the stator poles 22 will suspend the disk 12 and provide rotation thereof with little or no rubbing between the components, with the disk 12 being effectively supported on an air cushion. In one embodiment, the disk 12 may have a thickness of about 0.2 mm, an outer diameter of about 10 mm, and a density of about 3 gm/cc, with the time to spin-up to about 10,000 rpm being about 2 milliseconds.

A significant feature of the various embodiments of the microfiles disclosed herein is the ability to fabricate the microfiles using conventional lithographic and electroplating techniques with multiple microfiles being produced in a batch fabrication process. Many microfiles may be fabricated on a single substrate which may then be cut to separate each or selected groupings of the microfiles so produced. Fabrication of the integrated disk 12 and rotor 16 is a relatively simple process as described above. However, since it is desirable to fully integrate the stator pole cores 26 and coils 28 in three dimensions therearound, fabrication thereof is relatively more complex but may nevertheless be accomplished using conventionally known lithographic and electroplating techniques.

These techniques are generally carried out as a sequence of steps in which (1) a thin seed layer is applied over the entire surface topography, (2) a polymer is applied over the seed layer and openings are photolithographically defined in the polymer to serve as molds for electroplating, (3) the magnetic or electrically conductive material, as required, is electroplated into the defined openings, (4) the patterned polymer layer is removed and (5) those portions of the seed layer which were masked by the polymer are removed, typically by wet chemical etching or by sputter etching. The fabrication of a complex structure is typically accomplished by carrying out the above sequence several times with different masks and material by introducing layers as needed. It is understood that this process could be extended to provide multiple layers of coils which surround the stator cores.

For example, FIG. 5 illustrates a representative section of a fully integrated core 26 and coil 28 therearound. The fabrication process starts with a suitable substrate 30, such as silicon wafer or others, on which is suitably deposited a dielectric layer 36 such as hard baked photopolymers, polyimides, or $SiO_2$. Various lithographic optical and x-ray masks may be used as required for defining the various features of the stator 20. Additional dielectric layers 36 such as polyimide are formed and then suitably etched to form electroplating molds for the magnetic and electrically conducting components. A suitable seed layer is conventionally sputtered on the bottom dielectric layer 36 so that the bottom of the coil 28 may be formed by conventional electroplating of copper. Additional dielectric 36 such as polyimide is layered atop the electroplated bottom coil 28, and additional seeded layers are also applied so that the vertical portions of the coil 28 may be formed by electroplating. The core 26 is suitably electroplated atop another seed layer and is formed between the bottom and side portions of the coil 28 with the dielectric 36 providing electrical insulation therebetween. The top portion of the coil 28 is also suitably electroplated atop a seed layer for bridging the vertical portions of the coil 28 between adjacent turns thereof. Additional dielectric 36 may be layered over the top of the coil 28 to complete the vertical section thereof.

The support shaft 32 such as illustrated in FIG. 5 may be similarly formed by electroplating a suitable metal, such as copper for example, atop the substrate 30. As shown in FIG. 4, suitable bonding pads 40, or electrical terminals, are also formed integral in the substrate 30 and joined to respective ends of the individual coils 28 by electrical conductive lines 40a also formed on the substrate 30 for providing electrical current paths. The pads 40 may be disposed at a convenient location on the substrate 30, with the lines 40a having suitable elongate paths to diametrically opposite pairs of the stator coils 28 to form a series circuit powered by a suitable drive electronics set 40b which may be an integrated circuit module bonded to the substrate or lithographically formed and plated thereon. Power is provided to the coil 28 from the drive electronics 40b through the pads 40 to sequentially energize the respective stator poles 22 for rotating the disk 12.

As shown in FIG. 5, the completed core 26 and coil 28 are fully integrated with each other in a one-piece component and include electroplated magnetic material defining the core 26, and electroplated conducting material defining the coil 28, and a baked dielectric 36 therebetween which provides structural strength and electrical insulation. The lithographic and electroplating techniques for forming the section illustrated in FIG. 5 may be suitably applied for forming the various embodiments of the invention illustrated in the several Figures.

Referring again to FIG. 3, each access head 24 is selectively movable for selectively addressing data on each disk 12. A typical access head 24 conventionally includes its own actuator for providing the required movement thereof. However, in accordance with one embodiment of the present invention, a common actuator 42 is disposed between adjacent ones of the microfiles 12 for simultaneously supporting and selectively moving the respective access heads 24 thereof for addressing the data on each of the adjacent disks 12. The common actuator 42 illustrated in FIG. 3 is shown in more particularity in FIGS. 6 and 7, and includes a stationary base 44 and a pair of identical cantilever-type springs 46 fixedly joined at proximal ends thereof to the base 44. The springs 46 are laterally spaced apart from each other in parallel, and have distal ends fixedly joined to a rigid crossbar 48 extending therebetween. The crossbar 48 is disposed parallel to the base 44 in a generally rectangular configuration with the springs 46. This rectangular configuration is identical to that in the conventionally known flexural in-line actuator which approximates a four-bar linkage assembly for controlling movement thereof. The springs 46 may be formed of a suitable flexible metal such as stainless steel or nickel-cobalt based alloy with the center regions of the springs 46 being relatively rigid, with the proximal and distal ends thereof being relatively flexible. In this way, the crossbar 48 may translate relatively parallel to the base 44 by flexible bending of the springs 46 as shown in dashed line in FIG. 3 for positioning the access heads 24 joined thereto.

As shown in FIG. 3, a pair of flexible suspension arms 50 extend oppositely away from the crossbar 48 and coaxially therewith parallel to the base 44, with each suspension arm 50 flexibly supporting a respective one of the access heads 24 of the adjacent microfiles 10. A conventional voice coil motor (VCM) 52 is operatively joined to the crossbar 48, by a suitable extension thereof for example, for translating the crossbar 48 along its longitudinal axis in the movement direction labeled M which flexibly bends the springs 46 to selectively position the access heads 24 on respective ones of the disk 12 for addressing the data thereon.

Figure 6:
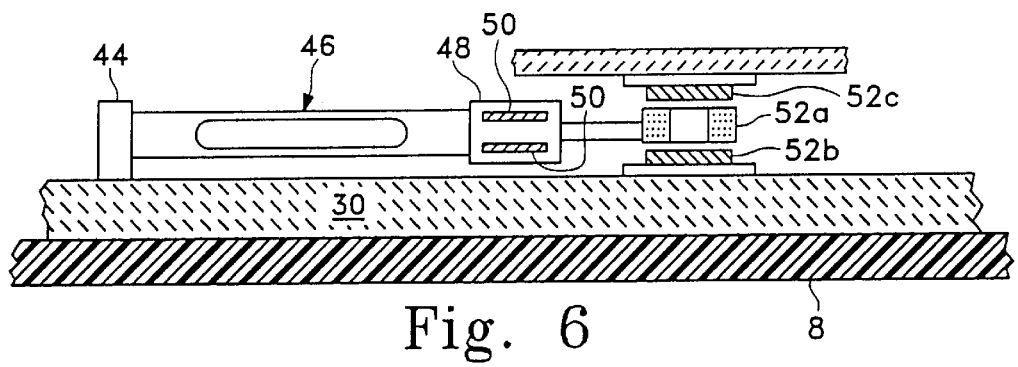
FIG. 6 is a partly sectional view of a portion of a common actuator for the adjoining microfiles 10 illustrated in FIG. 3 and taken along line 6—6.

In the exemplary embodiment illustrated in FIGS. 3 and 6, the VCM 52 includes an electrically conducting coil 52a fixedly joined to the crossbar 48 for movement therewith, and a pair of stationary flat permanent magnets 52b,c disposed on opposite sides of the coil 52a for magnetically moving the coil 52a as the coil 52a is energized. This type of VCM 52 is also conventional with suitable electrical leads (not shown) being joined to the coil 52a for providing a DC current thereto. Suitably energizing the coil 52a causes the coil 52a to move back and forth relative to the permanent magnets 52b,c for in turn translating the crossbar 48 and the access heads 24 joined thereto.

Figure 7:
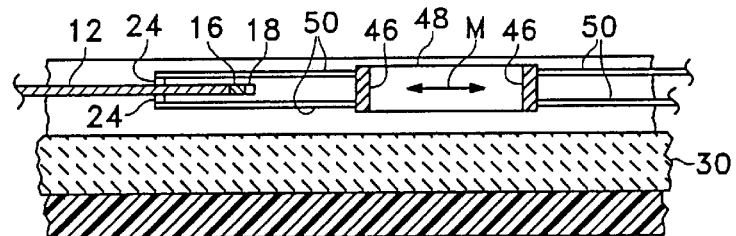
FIG. 7 is a partly sectional view of a portion of the common actuator illustrated in FIG. 3 and taken along line 7—7.

As shown in FIG. 3, the suspension arms 50 are preferably generally aligned radially with the disks 12 for radially translating the access heads 24 across the disks 12 for addressing the data. As shown in FIG. 7, respective access heads 24 and suspension arms 50 extend from the crossbar 48 both below and above the disk 12 for addressing data on both sides thereof in a conventional manner. Suitable electrical leads (not shown) extend from each of the access heads 24 for providing communication through the connector 6a illustrated in FIGS. 1 and 2. In the embodiment illustrated in FIGS. 3, 6, and 7, there are two access heads 24 per disk 12 with each access head 24 having both read and write capabilities. In alternate embodiments, separate heads may be used for independently reading and writing data.

Figure 8:
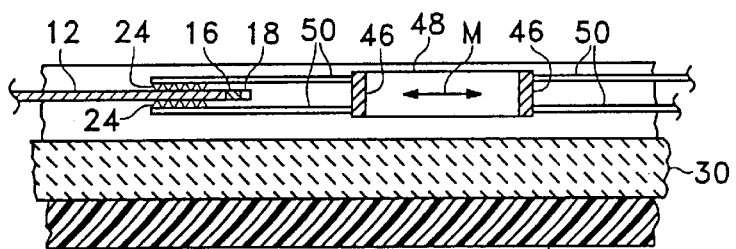
FIG. 8 is a portion of an actuator similar to FIG. 7 but disclosing a plurality of access heads in an array in accordance with another embodiment of the present invention.

And, in FIG. 8, a plurality of the heads 24 are suitably joined to each of the suspension arms 50, with the array of heads 24 being able to address the data in parallel for reducing the required physical displacement of the actuator 42 for accessing the entire data band on the disks 12, which therefore greatly decreases seek time.

By supporting the access heads 24 for the adjacent microfiles 10 from a common actuator 42, the resulting assembly is therefore simpler in structure while allowing independent or simultaneous access to data on the disks 12. Although this arrangement results in the access head 24 of adjacent disks translating relatively oppositely to each other, with one access head 24 moving radially inwardly as the other access head 24 moves radially outwardly, data may nevertheless be written to and/or read from the respective disks 12 simultaneously, if desired. Various Redundant Arrays of Inexpensive Disks (RAID) configurations may be employed.

As indicated above, the microfiles 10 illustrated in FIG. 3 for example, may be suitably formed using conventional lithographic and metal deposition techniques typically utilized in fabricating small integrated circuit chips. Although the actuator 42 may be conventionally formed using stamped thin sheet metal, the actuator 42 may also be formed using conventional lithographic and electroplating processes. For example, the springs 46 may be formed from silicon, and the voice coil 52a may have conductive lines lithographically defined on a non-conductive substrate, with the magnetic field provided by the permanent magnets 52b,c. In this way, the microfiles 10 including the actuators 42 therefor may be fabricated at ever decreasing sizes limited only by the ability to microfabricate the components thereof. Furthermore, all appropriate electronics for operating the microcard 6 may also be directly integrated on the common substrate 30.

Accordingly, the form factors associated with magnetic storage disks may be further reduced over those presently available since the mechanical limitations of providing rotation of the storage disk and read/write access thereto are eliminated by using lithographic and plating processes to fabricate the micro components thereof.

For example, the exemplary microcard 6 illustrated in FIG. 2 includes eight microfiles 10 arranged in four pairs, with each pair having an independent common actuator 42. The eight microfiles 10 may be arranged in the microcard 6 using the 5.0 cm standard disk form factor with a length L of about 7.3 cm and a width W of about 5.0 cm for an area of about 36.5 $cm^2$. The relatively small size of the individual microfiles 10 now allows subform-factors to be achieved. For example, a one-half disk form factor, relative to the 5.0 cm form factor, i.e. 1.3 in (3.7 cm) form factor, of about 18.3 $cm^2$ may be obtained using four of the microfiles 10 as shown in the dashed line labeled $F_a$ in FIG. 2. Each decreasing disk form factor has as its narrow side one half the length of the long side of the previous form factor. As shown in FIG. 2, the form factor $F_a$ is a rectangle measuring L/2 by W relative to the standard 5.0 cm form factor.

Correspondingly, a pair of microfiles 10 may be configured in a one-quarter subform factor designated $F_b$ within the dashed lines illustrated in FIG. 2, and shown enlarged in FIG. 3. This one-quarter or 1.0 in (2.5 cm) form factor has an area of about 9 $cm^2$, with two microfiles 10 being arranged in a rectangle L/2 by W/2, again relative to the standard 5.0 cm form factor. The required connector 6b for personal computer (PC) card use is illustrated in phantom in FIG. 3. FIG. 3 is also schematically representative of achieving even a one-eighth subform factor, i.e. 0.7 in (1.9 cm) form factor, of about 4.5 $cm^2$ area. In this arrangement, the microfiles 10 would be suitably smaller for being arranged in a rectangular configuration L/4 by W/2 relative to the standard 5.0 cm form factor. Or, a single microfile 10 may be used in the one-eighth subform-factor for even smaller form factors as desired. The one-quarter and one-eighth disk form factors are not known to presently exist, with the microfiles 10 providing the ability to achieve such small form factors using conventional lithographic and plating processes.

Of course, any number of microfiles 10 could be configured on a standard PCMCIA microcard 6, or on subforms thereof, from a single microfile 10 to the eight microfiles 10 illustrated in FIG. 2, or more if desired. The standard microcard 6 may be suitably configured to contain in part one or more microfiles 10, and in remaining part any suitable additional electronic circuits which could be used to operate the microcard 6. The PCMCIA microcard 6 could readily be fitted with a rechargeable battery and be self sustained as far as power is concerned.

Exemplary embodiments of the present invention have been disclosed above, with various other configurations thereof being also available. For example, although individual microfiles 10 having single disks 12 therein have been disclosed above, each microfile 10 could alternatively have a plurality of coaxially stacked disks 10, or multidisks, on a common rotor shaft with a suitably integrated micromotor 14 rotating the several multidisks simultaneously as disclosed in more detail in the cross referenced patent application. Corresponding access heads 24 for each of the multidisks 12 would also be provided for accessing the data thereon.

There are, of course, very many practical applications which may use these subform factor microfiles 10. For example, they may be used in local storage or libraries of the size such as in a regular wrist watch. A large stack of microfile disks with its own battery could be located inside a pen or such similar device which may be conveniently carried around for storing data. When connected to a CCD camera device and/or audio microphone such microfiles might readily become a video recorder, a voice recorder, or a still camera based on magnetic digital storage of voice or images. The microfiles could be configured in a self contained magnetic recording device equipped with a microphone, CCD camera, loud speaker, and micro-display for direct viewing or projection viewing.

Although the above described embodiments utilize a magnetic data storage disk 12, the disk may take other conventional forms for storing data. The storage disk may take other conventional forms on which the data is suitably stored, and optically read using a conventional optical laser reading head. Such an optical disk may take conventional forms such as CD ROM, Write-Once-Read-Many times (WORM), magneto-optic, or phase-change disks.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A microfile comprising:
    a rotatably supported storage disk for storing data;
    a micromotor for rotating said disk and including a rotor integrated with said disk in a one-piece assembly, and also including a stator, said rotor having a plurality of magnetic rotor poles extending radially outwardly from a perimeter thereof and being circumferentially spaced apart therearound, and said stator having a plurality of magnetic stator poles circumferentially spaced apart from each other around said rotor for sequentially cooperating with respective ones of said rotor poles for rotating said rotor to rotate said disk;
    a selectively movable access head for selectively addressing said data on said disk
    each of said stator poles comprising a magnetic core integrally wound with an electrically conducting coil for generating a magnetic flux through said core upon energizing thereof; and
    said stator pole cores and coils being integrated on a substrate and comprising deposited magnetic material and deposited conducting material, respectively, and a dielectric therebetween.

2. A microfile according to claim 1 wherein said stator poles are arranged in cooperating pairs on opposite sides of said rotor, with sequential stator pole pairs being electrically energizable in different phases for maintaining rotation of said rotor and disk.

3. A microfile according to claim 2 wherein said stator pole coils spiral around said stator pole cores.

4. A microfile according to claim 3 wherein said rotor is coplanar with and integrally surrounds said disk.

5. A microfile according to claim 4 wherein each of said stator cores is generally U-shaped and is disposed coplanar with said rotor, and defines a pair of circumferentially adjacent stator poles.

6. A microfile according to claim 5 wherein said rotor comprises a magnetic ring integrally joined to said rotor poles for carrying magnetic flux between diametrically opposite ones of said rotor poles.

7. A microfile according to claim 4 wherein said disk includes a central bore receiving therein a support shaft for allowing said disk to rotate on said support shaft.

8. A method of forming the microfile of claim 1 comprising forming said micromotor using lithographic and metal deposition steps on a substrate.

9. a microcard comprising:
    a pair of laterally adjoining, coplanar microfiles, each including:
        a rotatably supported storage disk for storing data;
        a micromotor for rotating said disk and including a rotor integrated with said disk in a one-piece assembly, and also including a stator, said rotor having a plurality of magnetic rotor poles extending radially outwardly from a perimeter thereof and being circumferentially spaced apart therearound, and said stator having a plurality of magnetic stator poles circumferentially spaced apart from each other around said rotor for sequentially cooperating with respective ones of said rotor poles for rotating said rotor to rotate said disk;
        a selectively movable access head for selectively addressing said data on said disk;
        each of said stator poles comprising a magnetic core integrally wound with an electrically conducting coil for generating a magnetic flux through said core upon energizing thereof; and
        said stator pole cores and coils being integrated on a substrate and comprising deposited magnetic material and deposited conducting material, respectively, and a dielectric therebetween; and
    a common actuator disposed between adjacent ones of said microfiles for simultaneously supporting and selectively moving said access heads thereof for addressing said data on said disks.

10. A microcard according to claim 9 wherein said common actuator comprises:
    a stationary base;
    a pair of spaced apart, parallel, cantilever springs fixedly joined at proximal ends thereof to said base;
    a crossbar fixedly joined to distal ends of said springs and parallel to said base;
    a pair of suspension arms extending oppositely away from said crossbar and coaxially therewith, with each suspension arm supporting a respective one of said access heads of said adjacent microfiles; and
    a voice coil motor operatively joined to said crossbar for translating said crossbar and flexibly bending said springs to selectively position said access heads on respective ones of said disks for addressing said data thereon.

11. A microcard according to claim 10 wherein said suspension arms are generally aligned radially with said disks for radially translating said access heads across said disks for addressing said data.

12. A microcard according to claim 10 wherein said voice coil motor comprises:
- an electrically conducting coil fixedly joined to said crossbar for movement therewith; and
- a pair of stationary permanent magnets disposed on opposite sides of said coil for magnetically moving said coil as said coil is energized.

13. A microcard according to claim 10 further comprising a plurality of said microfile pairs, each having an independent one of said common actuator.

14. A microcard according to claim 10 further comprising a plurality of microfile pairs arranged in a reference 5.0 cm disk form factor of about 36.5 square centimeters and configured in a Personal Computer Memory Card International Association (PCMCIA) rectangular form having an electrical connector at one end operatively joined to said microfile pairs.

15. A microcard according to claim 14 further comprising four of said microfile pairs.

16. A microcard according to claim 10 further comprising a plurality of said microfile pairs arranged in one-quarter said reference disk form factor of about 9 square centimeters.

17. A microcard according to claim 16 further comprising two of said microfile pairs.

18. A microcard according to claim 10 further comprising a plurality of said microfile pairs arranged in one-eighth said reference disk form factor of about 4.5 square centimeters.

19. A microcard according to claim 18 comprising one pair of said microfiles.

20. A microcard according to claim 10 wherein said stator poles are arranged in cooperating pairs on opposite sides of said rotor, with sequential stator pole pairs being electrically energizable in different phases for maintaining rotation of said rotor and disk.

21. A microcard according to claim 20 wherein said stator pole coils spiral around said stator pole cores, and are integrated on said substrate and comprise electroplated magnetic material and electroplated conducting material, respectively, and a dielectric therebetween.

22. A microcard according to claim 20 wherein said rotor is coplanar with and integrally surrounds said disk.

23. A method of forming the microcard of claim 9 comprising forming said micromotor using lithographic and metal deposition steps on a substrate.

* * * * *